Sept. 14, 1954

M. G. SOGGE
CONTROL DEVICE 2,688,974

Filed June 26, 1950

INVENTOR.
MELVIN G. SOGGE
BY
George H Fisher
ATTORNEY

Patented Sept. 14, 1954

2,688,974

UNITED STATES PATENT OFFICE 2,688,974

CONTROL DEVICE

Melvin G. Sogge, St. Louis Park, Minn., assignor to Minneapolis-Honeywell Regulator Company, Minneapolis, Minn., a corporation of Delaware Application June 26, 1950, Serial No. 170,356

5 Claims. (Cl. 137—66)

This invention relates to a control device for use in heating systems to provide safety means for shutting off the flow of fuel to the heating system in the event an unsafe condition arises in the heating system. More particularly, the invention relates to a gas valve of the manual reset type wherein both a main valve and a pilot valve are provided and wherein an electromagnet, energized by a thermocouple heated by a pilot burner in the heating system, controls the opening of the main valve and the shutting off of both of said valves.

While control devices of the above mentioned type are well known in the prior art, most of these prior art devices do not provide for selectively adjusting the size of the main valve opening following a resetting of the safety control elements of the device. The devices of the prior art which do provide for such adjustment of the main valve, have been and are quite complicated and of costly construction.

One of the objects of this invention is to provide a control device of the above mentioned type, that is inexpensive, yet of simple and sturdy construction.

Another object of the invention is to provide a combined main and pilot valve, controlled by a thermocouple-energized electromagnet, wherein the manual reset means for the valves enables the main valve to be held closed while resetting the thermocouple controlled mechanism connected thereto and opening the pilot valve and, thereafter, selectively opening the main valve to the desired extent without variably adjusting the "dropout" force of the safety mechanism.

A further object of the invention is to provide a compact control device for controlling the flow of main and pilot gas to a heating system wherein means is provided on said control device for selectively establishing communication between the pilot valve and the inlet chamber of the main valve or between the pilot valve and an exterior tapping of said device for connection to a separate gas line.

Other objects of the invention will become apparent upon reading the following detailed description of the invention in conjunction with the accompanying drawings wherein.

Figure 2:
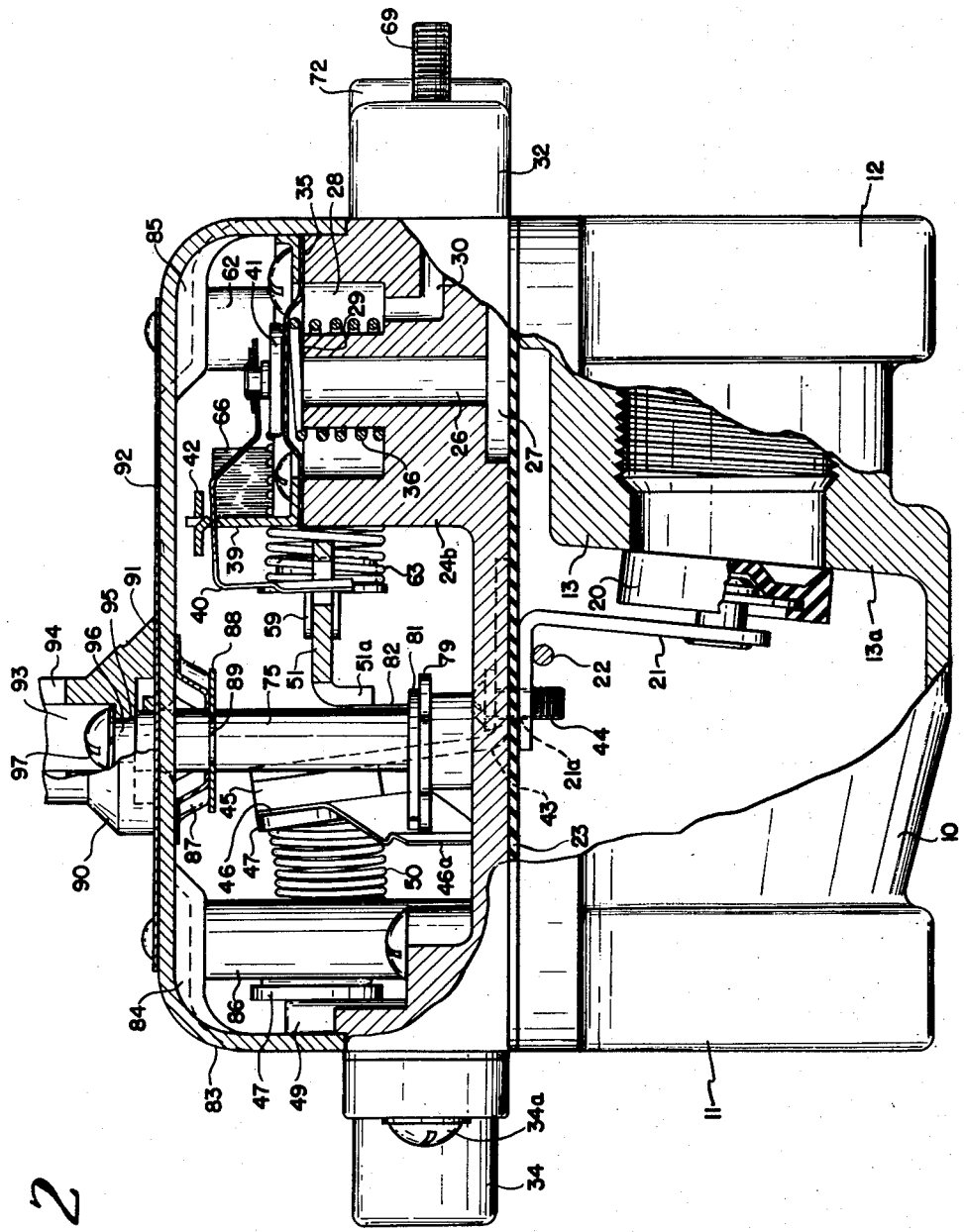
Figure 2 is a side elevational view of the control device with portions thereof broken away.
Figure 3:
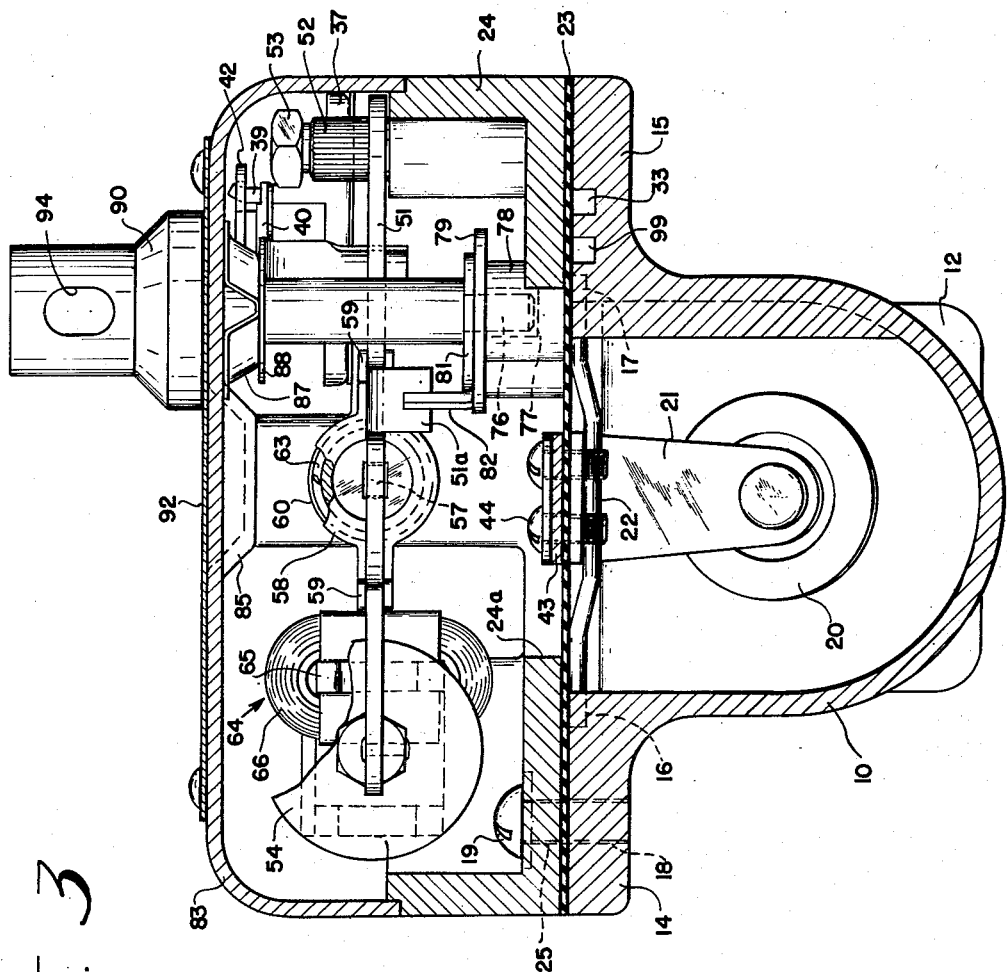
Figure 3 is a sectional view taken along line 3—3 of Figure 1.

As can best be seen in Figures 2 and 3 of the drawing, the control device has a main valve body 10 having an inlet 11 and an outlet 12, each of which is screw-threaded to receive pipes (not shown) connected to a source of fuel supply and the main burner of a heating plant, respectively. A partition wall 13 between the inlet and outlet, has a smooth surface 13a that serves as a valve seat. The upper portion of the valve body 10 has horizontally extending flanges 14 and 15, with an opening 10a therebetween communicating with the inlet side of the interior of the valve. In the upper surface of the valve body 10, on opposite sides of the opening 10a, are aligned recesses 16 and 17 while at spaced points around the upper portion of the valve body 10 and the flanges 14 and 15, are threaded bores 18 for receiving clamping screws 19.

A valve 20, of conventional construction, is suitably secured to an L-shaped lever 21, which, in turn, is welded to a pivot 22 so as to be rockable into and out of engagement with the valve seat 13a. The pivot 22 is transversely offset intermediate its ends, where it engages the L-shaped lever 21, and is out of alignment with its two ends which rest in the recesses 16 and 17, respectively. A diaphragm 23 covers the upper surface of the valve body 10 and its flanges 14 and 15 and is suitably apertured to receive the clamping screws 19. The diaphragm also has two holes therein in alignment with threaded holes 21a in the leg of the L-shaped lever 21 adjacent the pivot 22, for a purpose to be presently described.

Resting on the upper surface of the diaphragm 23, is a generally cup-shaped housing 24 having an opening 24a in the bottom thereof substantially coextensive with the opening 10a in the upper portion of the valve body 10. The housing has spaced bores therein in axial alignment with the threaded bores 18 and through which the clamping screws 19 freely slide for sealingly clamping the housing against the diaphragm 23 and the diaphragm 23 against the valve body 10. It will be noted that when the housing is so mounted on the valve body, the ends of the pivot 22 will be held within the recesses 16 and 17, respectively.

Formed in a thickened portion 24b of the housing, is a pilot valve comprising a bore 26, extending vertically through said thickened portion and terminating in an enlarged bore 27 in the bottom surface of the housing. Coaxial with the bore 26 is an annular recess 28 which forms between said recess and the bore 26 a valve seat 29. The recess 28 communicates through a passage 30 with a threaded tapping 31 in a boss 32 formed on the sidewall of the housing 24. The threaded or tapped opening 31 is adapted to receive a conduit leading to the pilot burner of the heating system. The enlarged bore 27 communicates, through a groove 33 formed in the bottom surface of the housing 24, with the exterior of the housing at an adaptor plate 34, the details of which will be hereinafter described.

Extending across the upper surface of the enlarged portion 24b, is a diaphragm 35 which is normally biased out of engagement with the valve seat 29 by means of a compression spring 36. The diaphragm is clamped to the upper surface of the enlarged portion 24b by means of a plate 37 which is held thereon by means of clamping screws 38. The plate 37 has an upwardly-extending forked wall 39 forming a fulcrum or pivot for a lever 40. The lever 40 is generally L-shaped and has a horizontally extending leg thereof resting on the pivot 39, between the forks thereon, and has a downwardly extending leg adapted to be engaged by an actuating means, to be presently described. The end of the horizontally extending leg carries a disc-like valve head positioned over the diaphragm 35 in axial alignment with the bore 26. The disc is wobbily connected to the lever 40 in a manner well known in the art to assure proper seating of the valve on the seat 29. The lever 40 is prevented from lifting off of the pivotal edge of the pivot 39 by means of an elongated washer-like member 42 having a downwardly struck portion for engaging the lever to provide a knife edge upper pivot for said lever. The washer is held on the wall 39 by laterally bending the forks thereof over the upper surface of the washer-like member 42. It is thus seen that the spring 36 normally biases the diaphragm 35 upwardly against the disc 41 to cause the lever 40 to rock in a counter-clockwise direction, thus establishing communication between the inlet passage 26 of the pilot valve and the outlet passage 30.

Positioned on the upper surface of the diaphragm 23 opposite the horizontally extending leg of the lever 21, is another generally L-shaped lever 43 positioned opposite the horizontal leg of lever 21 and secured thereto by means of clamping screws 44 extending through the horizontally extending leg of the lever 43, the diaphragm 23 and screw-threaded into said holes 21a of the horizontal leg of the lever 21 described above. The generally vertically extending leg of the lever 43 has a transversely extending arm 45 to which is secured one end of a stiff leaf-spring member 46 and a centering stud 47 by means of a rivet 48. A similar centering stud 47 is also riveted, in opposed relationship to the stud on the arm 45, to a arm 49 extending upwardly from the housing 24. A compression spring 50 is positioned between the two centering studs to normally bias the levers 43 and 21 clockwise about the pivot 22 to open the valve 20.

A lever 51, connected at one of its ends by a force fit of an aperture therein over an externally knurled surface of a bearing sleeve 52, is pivoted on a pivot bolt 53 screw-threaded into a sidewall of the housing 24. The lever 51 substantially spans the width of the housing and carries at its other end an armature 54. The armature is secured to said lever by a rivet 55 extending through the lever and the stem of the armature. The lever 51 has a rectangular opening therethrough, a short distance from the pivot bolt 53, through which the downwardly extending leg of the lever 40 extends. The size of the hole 56 is such that in one position assumed by the lever 51, the valve 41 is held closed and in another position of the lever 51, the lever 40 is free to move to its open position under the bias of spring 36. Substantially centrally of the lever 51 is a laterally extending pin 57 which extends through a centering washer 58 secured to the lever 51 by means of a clip 59. Spaced from and in opposed relationship with the centering washer 57, is a second centering washer 60 that is adjustably supported on an adjusting screw 61 extending through an upwardly extending arm 62 formed on housing 24. A coil compression spring 63 is positioned between the centering washer 57 and the centering washer 60 to normally bias the lever 51 in a counterclockwise direction. A rounded edge portion 51b of the lever 51, on the opposite side of the lever from the centering washer 58, is adapted to engage the upwardly extending leg of the lever 43 to move the valve 20 into seating relationship with the valve seat 13, against the bias of spring 50, when the spring 63 is free to move the lever 51 in the above mentioned counterclockwise direction. When the lever 51 is in the position which holds the main valve 20 closed, the opening 56 in said lever is in the position which holds the pilot valve closed, also, against the bias of its spring 36.

The safety means for holding the main and pilot valves open so long as a safe operating condition exists in the heating system, namely, the burning of the pilot burner, consists of an electromagnet generally designated by the reference numeral 64. It consists of a generally U-shaped core member 65, which is secured to an upwardly extending arm 73 of housing 24 by bolt 74, and on one leg of which is mounted a coil of wire 66 that is adapted to be energized by the current generated by a thermocouple A-B positioned so as to be heated by a pilot burner E. Leads 67 and 68 of the coil are connected to connector terminals 69 and 70 respectively. The terminals extend through a terminal block 71, made of any suitable electrically insulating material. Terminal block 71 carries a rib 72 which serves as means to prevent a wire wound on either of the terminal 69 and 70 from contacting the other of said terminals. Terminal 69 is schematically shown as being connected by the lead wire D to the element B of the thermocouple while the terminal 70 is schematically shown as being connected by the lead wire C to the element A of the thermocouple. The lead wires C and D are adapted to be clamped on the terminals 70 and 69, respectively, by means of nuts that are not shown in the drawing.

When the armature 54 is in engagement with the electromagnet 64 and the pilot burner E is supporting a flame, the current flowing through the coil 66 is sufficiently strong to cause the electromagnet to hold the armature and the connected lever 51 in said position against the bias of spring 63. It is thus seen that when the lever 51 is so held, the main valve and the pilot valve are free to move to their open positions under the bias of their own springs 50 and 36, respectively.

The means for actuating the lever 51 to its position against the electromagnet is a manually rotatable shaft 75 having a portion 76 of reduced diameter pivotally extending into a recess 77 in a boss 78 on the housing 24 (see Figure 3). Immediately above the boss 78, a cam plate 79 is nonrotatably secured to the shaft 75. Resting on the cam plate 79 and also nonrotatably secured to the shaft 75 by a suitable means, such as by brasing, and to the cam plate 79 by means of interengaging detents 80, is a crank plate 81 carrying an upwardly extending arm 82. The upper portion of the shaft 75 is pivoted in and extends through a bore in a cover member 83. The cover member is secured to the housing 24 by means of bolts (not shown) extending through holes (not shown) in indentations 84 and 85 in said cover member and screw threaded into a post 86 formed on the housing 24 and the boss 62, respectively. Shaft 75 is resiliently held in position by means of a spring washer 87 positioned between the under side of the cover 83 and a clip washer 88 engaging an annular groove 89 in the shaft 75. The upwardly extending arm 82 on the plate 81 is adapted to engage a downwardly extending arm 51a on the lever 51 when the shaft is rotated in a clockwise direction, as viewed in Figure 1.

The cam disc 79 has a surface portion 79a that is of uniform radius for approximately one half of the circumference of the disc. Another surface portion 79b, is even with the surface portion 79a at the upwardly extending arm 82 but decreases in radius through an arc of approximately 90°, whereupon, it again increases in radius on a straight line to the other end of the surface portion 79a. The cam surfaces 79a—79b are engaged at different times by the free end of the spring arm 46, which is bent to provide a line contact rib 46a. The surface 79a is of such magnitude that said surface holds the valve 20 firmly but resiliently against the valve seat 13 through the leaf spring 46. When the shaft 75 is rotated in a counterclockwise direction, with the armature 54 being held by the electromagnet, the rib 46a on the free end of the arm 46 will follow the cam surface 79b, under the bias of spring 50, so as to permit the lever 43 and 21 to rotate in a clock-wise direction on pivot 22 to any selected valve open position as determined by the cam surface 79b.

The means for rotating the shaft 75 consists of the knob 90 having a pointer 91 for cooperation with a name plate 92 carrying indicia (not shown) which cooperates with the pointer 91 to indicate the valve position. The knob has a square hole in the upper portion thereof and a transverse hole 94 extending laterally therethrough to be selectively engaged by a suitable control arm, from a remote position, as when the control device is used in a floor furnace installation. Extending from the bottom of the square recess 93 and through the bottom of the control knob 90 is a non-round hole 95 that fits over a complementary shaped end portion 96 on the shaft 75. A screw 97 is threaded into a threaded bore 98 in the upper end of shaft 75 to retain the knob 90 on said shaft.

As shown in the drawing, the elements of the device are shown in the positions that they would assume when the manual reset knob 90 has been rotated in a clockwise direction sufficiently to bring the armature 54 into engagement with the electromagnet. The pilot burner E is shown as supporting a pilot flame in which the hot junction of the thermocouple A—B is positioned, and the adaptor plate 34 is shown in the position wherein a separate gas line extending from the control device would be used to bypass a solenoid valve or other automatically controlled valve in series with the main valve and the source of fuel supply. With this arrangement, the gas flow through the inlet and outlet ports 11 and 12 of the control device may be interrupted without the main valve 20 closing, by means of the said solenoid valve or other control valve, but without interrupting the flow of gas to the pilot burner, through the adaptor plate 34 and the pilot valve.

Should it be desired to use the device in a system not having a solenoid or other control valve and where it would be desirable to cut off the gas flow to the pilot burner whenever the gas flow through the main valve is interrupted, by going into safety position, said adaptor plate 34 is provided with a groove 100 which, when the plate 34 is rotated through an angle of 180° and refastened to the housing 24 by screws 34a, will direct or establish communication between the passage 33 and a second passage 99 formed in the bottom surface of the housing 24, a passage 10a extends from said passage 99 through the diaphragm 23 and the side wall of the valve body 10 into the inlet chamber of the valve body 10. With this arrangement, it is noted that gas for the pilot burner will flow from the inlet chamber through passage 10a, passage 99, passage 100, passage 33, the pilot valve, and the outlet 31 adapted to be connected to the pilot burner, thus eliminating the additional supply pipe previously required for pilot gas supply to the valve.

*Operations*

With the elements of the device in the position shown in the drawings, that is, when the control knob 90 has been rotated in a clockwise direction to cause the armature to engage the electromagnet and the pilot valve to open, and with the pilot burner having been lit following the opening of the pilot valve, the manual control knob 90 is retained in this position for a time sufficient to enable the thermocouple to sufficiently energize the electromagnet 64 to retain the armature 54. Then, the manual knob 90 is rotated in a counterclockwise direction which carries the arm 82 away from the arm 51a, leaving the pilot valve in its open position, and bringing the cam surface portion 79b into engagement with the free end of the spring arm 46. The closer the end of the spring 46 is brought to the minimum radius portion, the greater will be the opening of the valve 20 and consequently the greater will be the flow of gas to the main burner. The rate of gas flow may thereafter be varied between full off and full on positions at any time by adjusting the position of the control knob to bring different portions of the surface 79b into engagement with the arm 46.

If for any reason the pilot flame should become extinguished, the thermocouple will become deenergized, which in turn will deenergize the electromagnet 64, causing the armature 54 to "dropout" or break away from the core 65 under the bias of spring 63. As the spring 63 is stronger than the combined strength of the spring 50 and the spring 36, the lever 51 will move in a counter clockwise direction, causing one side of the opening 56 therein to move the lever 40 of the pilot valve in a clockwise direction to close said pilot valve. This movement will simultaneously bring the portion 51b of the lever 51 into engagement with the upwardly extending leg of the lever 43 to move said lever in a counterclockwise direction to close the valve 20. It is thus noted that both of the valves will be closed, regardless of the position of the end of arm 46 on the cam 79b, the arm 82 being out of alignment with the arm 51a when the device is in operating condition. If for any reason the arm 82 should be in a position to be engaged by arm 51a, the spring 63 is strong enough to move it to cause both of the valves to be closed.

To reset the control device, it is necessary to again rotate the manual control knob 90 to bring the surface portion 79a of the cam into engagement with the arm 46 to assure that the main valve 20 is maintained closed while the continued movement of the cam 79 brings arm 82 into engagement with arm 51a to again position the lever 51 in its operative condition. Only if a flame is established at the pilot burner E will the return or counterclockwise movement of the control knob 90 enable the main valve to open. This is due to the fact that unless the coil 66 of the electromagnet is energized sufficiently to cause the armature 54 to be held, the return movement of the control knob will merely return the surface portion 51b of the lever 51 into engagement with the upwardly extending leg portion lever 43 before the arm 46 starts to follow the surface portion 79b of the cam.

Figure 1:
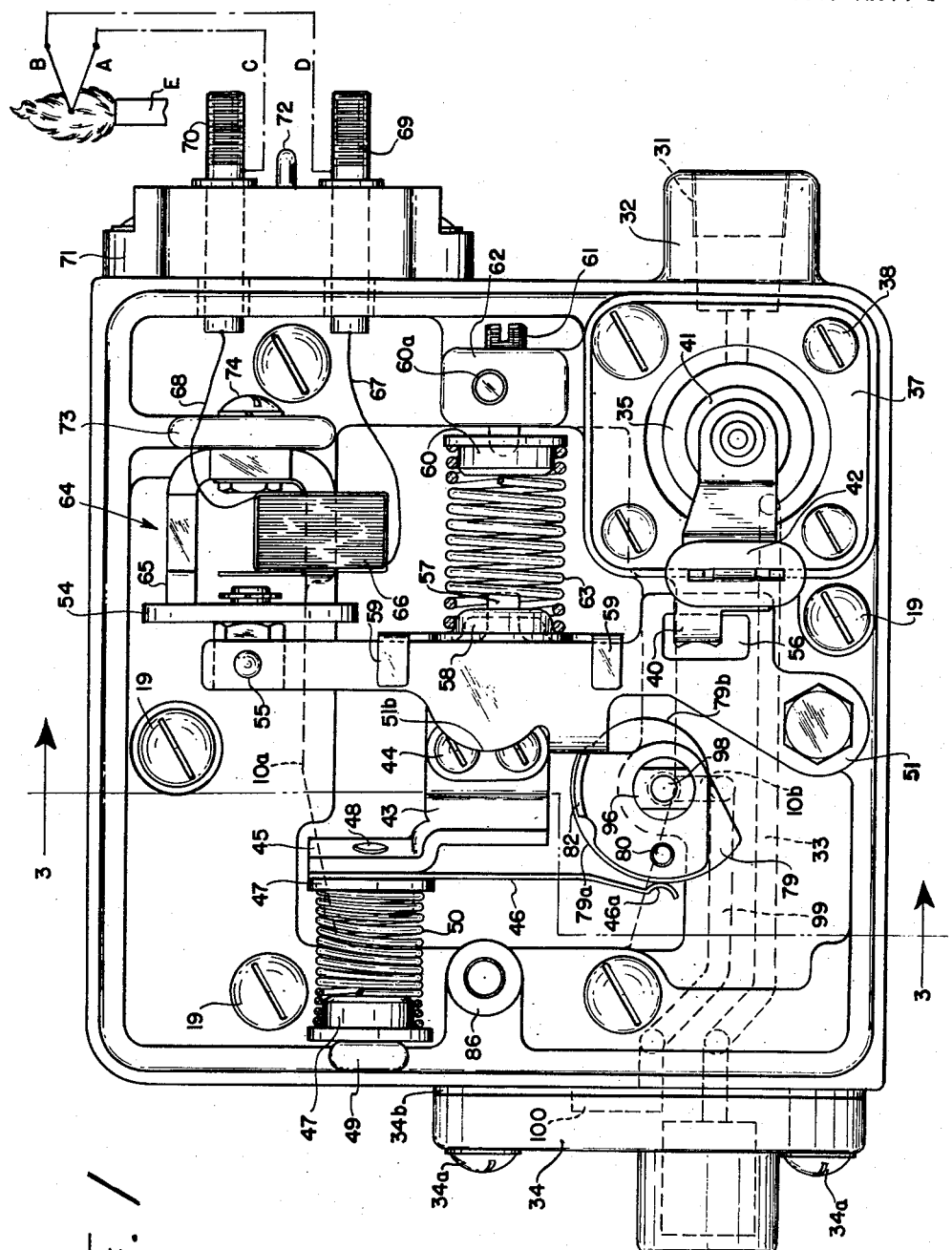
Figure 1 is a plan view of the control device with the cover thereof removed.

If the pilot burner is lit and it is desired to also shut it off, to provide 100% shut-off of the gas, counter clock-wise movement of the shaft 75 sufficiently far, will enable the armature to be pulled away manually from the electromagnet even if it is energized. This is accomplished by the arm 82 engaging the opposite or right hand side of the arm 51a, as seen in Figures 1 and 2, and positively moving the lever 51 counterclockwise by manual actuation of the shaft 75.

From the above description of the invention, it is apparent that the applicant has created a very simple, yet reliable, control device that provides 100% shutoff of gas in the event of flame failure at the pilot burner, and which also provides safety reset of the control device as well as main gas flow regulating means through a single control member. It will also be noted that the force at which the armature will leave the electromagnet is not varied by the varying of the rate of gas flow by varying the position of the control means.

While it will be obvious to those skilled in the art that other details of construction may be used to form a control device in accordance with the teachings of the above disclosure, it is to be expressly understood that the scope of the invention is to be determined solely by the appended claims.

I claim as my invention:

1. The combination comprising a hollow main valve body having an inlet and an outlet in axial alignment, a partition wall between said inlet and outlet having an aperture therein in alignment with said inlet and outlet, said body having an opening in the top thereof, a cup-shaped housing positioned over said opening, a diaphragm between said body and housing, two L-shaped members positioned on opposite sides of said diaphragm and bolted together to form a single lever, said lever being pivoted in the upper edge of said valve body and carrying a main valve at one end thereof within the valve body and in alignment with said aperture to control fluid flow through said aperture and body, the other end of said lever having a relatively stiff resilient arm extending laterally therefrom and being biased in a direction tending to open said main valve, a pilot valve in said housing biased toward open position, a second lever pivoted at one of its ends and carrying an armature thereon, an electromagnet cooperable with said armature, said second lever being biased into engagement with said pilot valve and said single lever to normally hold said valves closed and said armature spaced from said electromagnet, and means arranged to be manually operated in one direction into engagement with one side of said second lever for moving said armature into engagement with said electromagnet and causing said pilot valve to move to open position while holding said main valve closed and manually operated in the opposite direction to free said main valve for movement to open position by its biasing means provided said electromagnet is energized sufficiently to hold said armature, said manually operated means being arranged for engagement with the other side of said second lever upon further movement thereof in said opposite direction to mechanically force said armature away from said electromagnet and cause said main valve to close.

2. A control device comprising a first valve biased toward open position, a second valve biased toward open position, a lever pivoted at one of its ends near said first valve and carrying an armature at its other end, an electromagnet positioned to be engaged by said armature, means biasing said lever to normally hold said armature spaced from said electromagnet, said lever also engaging said first and second valves at spaced intermediate points on said lever to normally hold said valves closed against their respective biasing means, and cam means having a first portion thereof of uniform radius and positioned to engage and hold said second valve closed and a second laterally projecting portion thereof shaped and positioned to move said lever and position said armature against said electromagnet and open said first valve when moved in one direction and a third portion adjacent said first portion and of gradually decreasing radius for variably freeing said second valve to move to open position when said cam is moved in the opposite direction but only if said armature is held by said electromagnet.

3. A control device comprising a first valve biased toward open position, a second valve biased toward open position, said valves having separate inlet and outlet passages, a lever pivoted at one of its ends near said first valve and carrying an armature at its other end, an electromagnet positioned to be engaged by said armature, means biasing said lever to normally hold said armature spaced from said electromagnet, said lever also engaging said first and second valves at spaced intermediate points on said lever to normally hold said valves closed against their respective biasing means, cam means having a first portion of substantially uniform radius and positioned to engage and hold said second valve closed and a second abutment portion positioned to engage and to move said lever and position said armature against said electromagnet and open said first valve when moved in one direction and a third portion of gradually reducing radius located adjacent said first portion for variably freeing said second valve to move to open position under its bias when said cam is moved in the opposite direction, only if said armature is held by said electromagnet, and adjustable means for selectively establishing communication between the inlet passages of said valves or between the inlet passage of said first valve and an inlet port in an exterior wall of said device.

4. In a control device, the combination comprising a first control means having a first actuating means for biasing it towards on position, a second control means having a second actuating means for biasing it towards on position, a pivoted lever engaging said first and second control means, and movable between on and off positions, third actuating means resiliently engaging said lever and normally holding said first and second control means in their off positions against the bias of said first and second actuating means, coupling means on said lever, condition responsive means positioned to be engaged by said coupling means to hold said lever against the bias of said third actuating means for holding it out of biasing relationship with said first and second control means after the coupling means has been moved against said condition responsive means and only when said condition exists, and means operable in one direction to engage and hold said second control means in its off position while moving said lever and said first control means to their on positions with respect to said condition responsive means and then operable in another direction to disengage from said lever to adjustably free said second control means for movement to a selected on position under the force of said first actuating means.

5. A control device comprising a first valve biased toward an on position, a second valve biased toward an on position, said valves having separate inlet and outlet passages, an actuating means biased into engagement with said first and second valves to normally hold each of said valves in its off position, condition responsive means capable when a predetermined condition exists of holding but not moving said actuating means to an on position to free each of said valves for movement to its on position, manually operable means positioned to engage and to move said actuating means into its on position with respect to said condition responsive means, and adjustable means for selectively establishing communication between the inlet passages of said valves or between the inlet passage of said first valve and an inlet port in said adjustable means.

References Cited in the file of this patent

UNITED STATES PATENTS

| Number | Name | Date |
| --- | --- | --- |
| 2,381,926 | Ray | Aug. 14, 1945 |
| 2,387,164 | McCarty | Oct. 16, 1945 |
| 2,533,982 | Weber | Dec. 12, 1950 |